(12) United States Patent
Broyles

(10) Patent No.: US 11,864,656 B2
(45) Date of Patent: Jan. 9, 2024

(54) ADJUSTABLE FACE PILLOW APPARATUS

(71) Applicant: Bobby Don Broyles, Garland, TX (US)

(72) Inventor: Bobby Don Broyles, Garland, TX (US)

(*) Notice: Subject to any disclaimer, the term of this patent is extended or adjusted under 35 U.S.C. 154(b) by 257 days.

(21) Appl. No.: 16/893,013

(22) Filed: Jun. 4, 2020

(65) Prior Publication Data

US 2021/0378406 A1 Dec. 9, 2021

(51) Int. Cl.
*A47C 16/00* (2006.01)
*A47G 9/10* (2006.01)
*F16M 11/24* (2006.01)
*F16M 11/28* (2006.01)

(52) U.S. Cl.
CPC ............ *A47C 16/00* (2013.01); *A47G 9/1054* (2013.01); *F16M 11/242* (2013.01); *F16M 11/28* (2013.01); *F16M 2200/025* (2013.01)

(58) Field of Classification Search
CPC ....... A47C 16/00; A47C 16/02; A47C 16/025; A47C 16/04; A47C 7/00; A47C 7/002; A47C 7/004; A47C 7/006; A47C 7/38; A47C 7/36; A47C 7/383; A47G 9/1054; F16M 11/242; F16M 11/28; F16M 2200/025
See application file for complete search history.

(56) References Cited

U.S. PATENT DOCUMENTS

| | | | | |
|---|---|---|---|---|
| 755,043 A * | 3/1904 | Pike et al. | ............. | F16M 11/28 248/371 |
| 1,844,113 A * | 2/1932 | Beidler | ................. | F16M 11/10 280/47.32 |
| 4,671,478 A * | 6/1987 | Schoenig | ................ | F21V 21/14 248/123.2 |
| 5,257,429 A * | 11/1993 | Genis | .................. | A47G 9/1036 5/636 |
| 5,458,305 A * | 10/1995 | Woodward | ............. | F16B 7/149 248/188 |
| 6,106,123 A * | 8/2000 | McDonald | ................ | A61F 9/00 359/872 |
| 6,151,734 A * | 11/2000 | Lawrie | .................... | A61G 13/12 5/643 |
| 6,695,796 B1 * | 2/2004 | Solmor | ................ | A61G 13/121 606/240 |
| 6,718,582 B1 * | 4/2004 | Tinsley | ..................... | A47C 7/38 5/636 |
| 7,036,168 B1 * | 5/2006 | Knickerbocker | ...... | A61G 13/12 5/636 |
| 7,089,613 B2 * | 8/2006 | Cohen | .................... | A61G 13/12 5/640 |
| 7,703,725 B2 * | 4/2010 | May | ....................... | F16M 11/42 248/431 |
| 8,500,075 B2 * | 8/2013 | Frost | ..................... | B60P 3/1008 248/176.1 |
| 9,150,130 B2 * | 10/2015 | Jackow | ................. | A47C 16/00 |
| 9,226,587 B2 * | 1/2016 | Halimi | ................... | A47C 16/00 |
| 9,498,056 B1 * | 11/2016 | Mills | ...................... | F16M 11/26 |
| 9,782,317 B2 * | 10/2017 | Mount | ................... | A47C 20/02 |
| 9,877,588 B2 * | 1/2018 | Belleh | .................... | A47C 7/38 |
| 9,924,802 B2 * | 3/2018 | Mills | ...................... | A47C 7/383 |
| 9,961,421 B2 * | 5/2018 | Liao | ........................ | F16M 11/10 |
| 10,159,354 B2 * | 12/2018 | Rayburn | ................ | A47C 16/00 |

(Continued)

*Primary Examiner* — Nkeisha Smith

(74) *Attorney, Agent, or Firm* — Law Office of Bill Naifeh

(57) ABSTRACT

The present disclosure describes a bedside face pillow configured to provide adjustable face/head rest support.

13 Claims, 12 Drawing Sheets

(56) References Cited

U.S. PATENT DOCUMENTS

| | | | |
|---|---|---|---|
| 10,612,720 B2* | 4/2020 | Lin | G03B 17/561 |
| 10,663,839 B1* | 5/2020 | O'Brien | F16M 11/16 |
| 10,681,986 B1* | 6/2020 | Sanders | A45D 44/10 |
| 11,248,736 B2* | 2/2022 | Simon | F16M 11/041 |
| 2004/0195789 A1* | 10/2004 | Christensen | F16M 11/245 |
| | | | 280/35 |
| 2008/0078914 A1* | 4/2008 | Liao | G10D 13/28 |
| | | | 248/435 |
| 2013/0152828 A1* | 6/2013 | Chavira | F16M 11/2092 |
| | | | 108/12 |
| 2013/0232696 A1* | 9/2013 | Halimi | A47C 16/00 |
| | | | 5/640 |
| 2014/0312186 A1* | 10/2014 | Mech | A47C 20/026 |
| | | | 248/118 |
| 2015/0048223 A1* | 2/2015 | Mika | A47C 7/004 |
| | | | 248/188.7 |
| 2015/0285428 A1* | 10/2015 | Duperron | F16M 11/245 |
| | | | 248/163.1 |
| 2016/0081482 A1* | 3/2016 | Schumacher | A47C 7/383 |
| | | | 5/636 |

* cited by examiner ered over the upper shaft. In one embodiment, the upper shaft and the lower shaft are provided with locking means to slide and lock at a desired position.

ADJUSTABLE FACE PILLOW APPARATUS

CROSS-REFERENCE TO RELATED APPLICATION

This application claims the benefit of the filing date of U.S. provisional application No. 62/856,813, filed Jun. 4, 2019, entitled BEDSIDE FACE PILLOW, the disclosure of which is hereby incorporation by reference in its entirety.

TECHNICAL FIELD

The present invention generally relates to a headrest apparatus. More specifically, the present invention relates to a foldable headrest for a massage, configured to provide an adjustable face/head support that is independent of the bed or examination table.

BACKGROUND

A massage is the scientific manipulation of soft tissues of the body including superficial and deeper layers of muscles, connective tissues, tendons, ligaments and joints to improve the flow of blood and lymph, to reduce muscular tension, enhance tissue healing, and promote relaxation and well-being. The use of massage has been applied to the treatment of human conditions for thousands of years. Ancient civilizations have embraced the application of massage to counter a number of diseases or for relaxation. There is archaeological evidence found from various ancient societies across the world. The application of massage is probably as old as any human civilization since muscles, and connective tissues are always being tested to the limits by the humans.

Many ancient medical texts often refer to the technique of massage as a physical therapy meant for treating various ailments, wounds/injuries, relaxation, and pleasure. The treatments are often combined with oils and aromatic substances to enhance the overall experience of a therapeutic physical massage. Further, various developments have evolved in the physical therapy that made massage techniques become popular and as multi-billion-dollar business. The equipment utilized in massage therapy usually consists of a flat surface where a client, patient, recipient or person will comfortably lie face down so that the therapist can gain full access to the back muscles.

One such flat surface is a bed or a massage table, which is used to position the recipients during massaging. A typical massage table has a padded surface integrated with a head support. The head support allows the patient/client to breathe easily during lying face down. Further, these head supports are stationary, and the massage tables are expensive and heavy. In this position, a physician or doctor is treating a patient from some ailment on the back of the body. Some massage tables are available without a specially designed pillow, where the client/patient must turn their head on the massage table during massaging. This positioning of the body will result in discomfort for the client/patient. The specialized face pillow is often not present since it is a part of a specialized equipment that is often too expensive and/or not available.

Currently, when a standard examination table or bed is in use, the patient/client's head is turned to one side or the other or is tilted back uncomfortably during the examination or massage. If the head is turned to the side so the patient/client can breathe, the neck muscles are bunched on one side and stretched on the other, preventing the optimum in muscle manipulation. If the patient/client is on their back and the head is extended over the edge of the bed, the neck muscles are stretched significantly, and in some cases, painfully.

Therefore, there is a need for a specially designed bedside face pillow for professionals and for home therapy to prevent the discomfort of placing the head at odd angles when the patient is lying face down. Further, there is also a need for a foldable pillow stand configured to provide a completely adjustable face/head support that is independent of the bed or examination table.

SUMMARY

The present invention generally discloses a headrest apparatus. Further, the present invention discloses a foldable headrest for massage, configured to provide adjustable face/head rest support that allows a user to rest their face/head with full comfort.

According to the present disclosure, the bedside face pillow is an innovative health apparatus designed to provide a comfort and portability for physical exams or massages when lying face-down is required. In an embodiment, the apparatus comprises a pillow, a support plate, a support pole, a base assembly and a plurality of locking means. In one embodiment, the pillow is an open pillow. In another embodiment, the pillow is configured in a C-shape structure. In one embodiment, the pillow is configured over the support plate/a pillow platform. In some embodiments, the pillow is detachably connected to the support plate via one or more fasteners. In some embodiments, the fastener includes, but not limited to a Velcro® type fastener or hook and loop fasteners.

In one embodiment, the support plate is provided with an opening to match with the pillow structure, so that user's face is lying in the open pillow and resting comfortably. In one embodiment, the support plate is rotatably/foldably configured to the support pole via a connecting means. In some embodiments, the support plate is made from any of materials including, but not limited to iron, rubber or suitable durable materials. In another embodiment, the connecting means includes, but not limited to, a pivot joint.

In one embodiment, the support pole includes an upper shaft and a lower shaft. The upper shaft is slidably connected to the lower shaft via a locking means. In one embodiment, the bottom of the upper shaft and top of the lower shaft are connected via a locking means. In another embodiment, the locking means includes, but not limiting to a cylindrical brake shoe. In one embodiment, the top of upper shaft and the bottom of the support plate are connected via the connecting means. In one embodiment, the connecting means includes, but not limited to a pivot joint, folding hinge or rotating hinge. In some embodiments, the support plate is adjusted to any desired angle based on the user requirement. In one embodiment, the support pole is a telescopic adjusting pole. In one embodiment, the upper shaft and lower shaft are configured with the pre-defined length and diameter. In another embodiment, the support pole is constructed with any of materials including, but not limited to, strong metals, plastic, or suitable durable materials.

In one embodiment, the apparatus prevents the client/patient from discomfort when lying face down by providing the pillow with an opening for the face. Therefore, the patient head need not to turn at any angle. In some embodiments, the upper shaft and lower shaft are designed with any one of a hollow cylindrical configuration or hollow rectangular configurations. In one embodiment, the upper shaft and lower shaft has a pre-defined diameter and length. In another embodiment, the lower shaft is configured to slidably receive the upper shaft to adjust the height of the support pole according to the height of the bed. The pillow configured with bed provides the maximum comfort to the person.

In one embodiment, the base assembly is configured to the lower shaft via one or more wearing sleeves. In another embodiment, the base assembly is connected to the bottom of the lower shaft. In one embodiment, the base assembly includes, a wheel assembly configured at the distal ends of tripod base. In one embodiment, the tripod includes, at least three upper supporting bars and at least three lower supporting bars. In one embodiment, the apparatus is positioned by locking the casters to prevent any shifting during treatment or therapy. In another embodiment, the casters are unlocked to move the apparatus. In one embodiment, the locking means are positioned in strategic positions along the product to allow maximum adjustability.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments will now be given with reference to the Figures. It is expected that the present invention may be embodied in other specific forms without departing from its spirit or essential characteristics. The described embodiments are to be considered in all respects only as illustrative and not restrictive.

Figure 1:
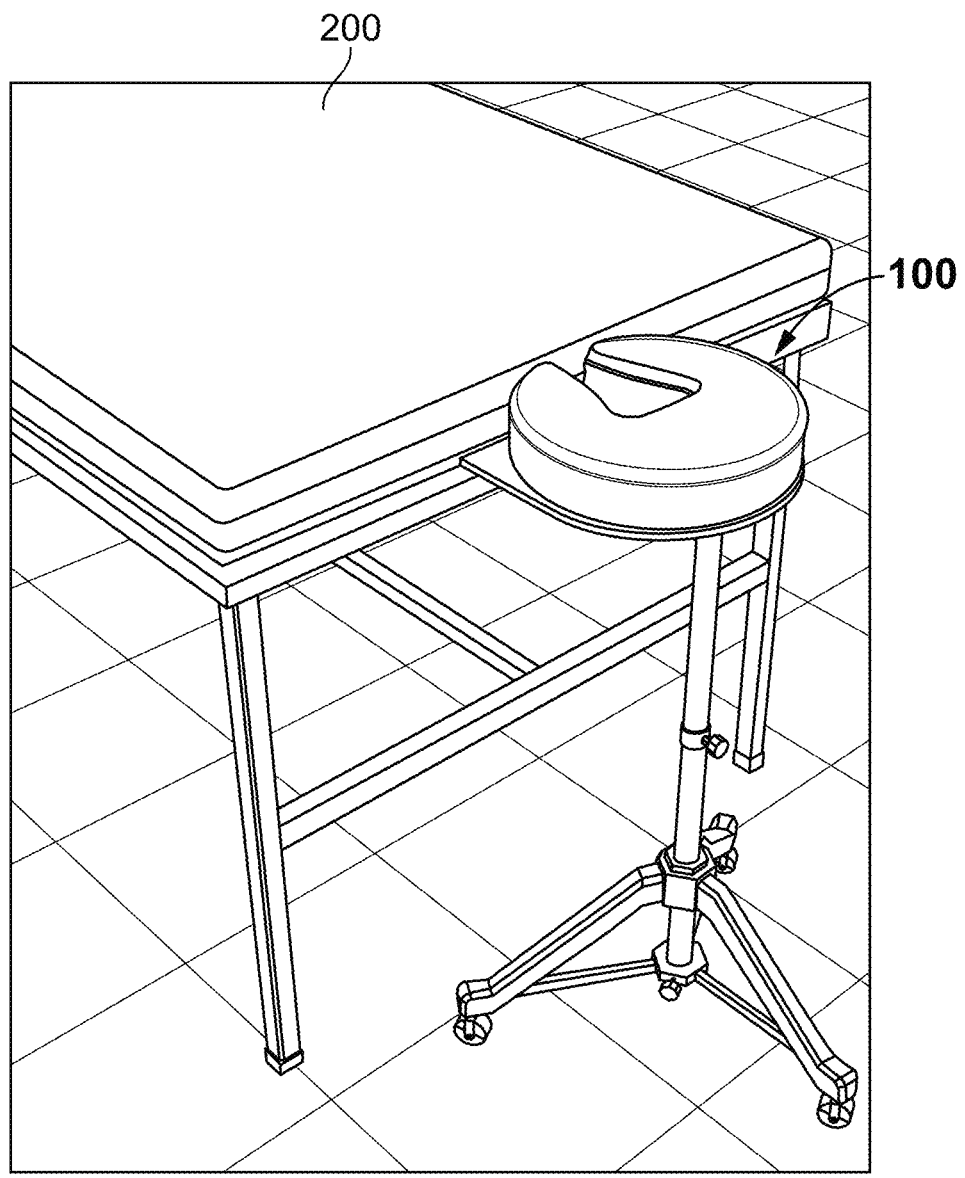
FIG. 1 shows a top perspective view of a bedside face pillow apparatus attached to the bed in an embodiment of the present invention.

Referring to FIG. 1, a bedside face pillow 100 is an innovative and unique health product positioned with a bed 200 is illustrated, according to the present invention. In an embodiment, the apparatus 100 is a portable pillow stand for massages or medical exams, where the client/patient is in a face-down position. The apparatus 100 is equipped with locking casters to allow easy positioning of the apparatus 100. In one embodiment, apparatus 100 enables the user to keep their head in the proper position and preventing from turning sideways or bending back into an uncomfortable position. In some embodiments, the apparatus 100 has been designed to sit/position near any of the bed, examination table, or massage bed heights. In another embodiment, the apparatus 100 provides comfort and portability for physical exams or massages when lying face-down is required. The positioning of the apparatus 100 enables comfortable cushion of the patient/client's head in the optimum position during the massage or medical exam.

Figure 2:
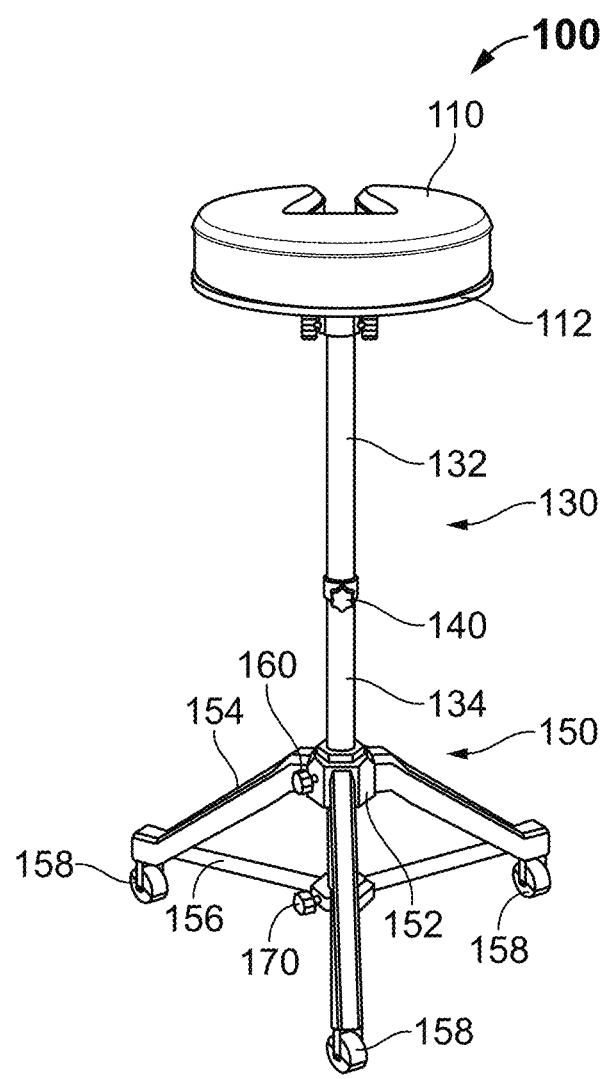
FIG. 2 shows a top perspective view of the apparatus in one embodiment of the present invention.

Referring to FIG. 2, a front perspective view of the apparatus 100 is illustrated, according to an embodiment of the present invention. In one embodiment, the apparatus 100 comprises a pillow 110, a support plate 112, a support pole 130, a base assembly 150 and a plurality of locking means (120, 140, 160 and 170). The pillow 110 is configured to position over the support plate 112. In one embodiment, the pillow 110 is an open pillow. In another embodiment, the pillow 110 is configured in a C-shape structure. In one embodiment, the support pole 130 includes, an upper shaft 132 and a lower shaft 134. The upper shaft 132 and the lower shaft 134 are connected via a locking means 140. In one embodiment, the bottom of the upper shaft 132 and top of the lower shaft 134 are connected via a locking means 140. In another embodiment, the locking means 140 includes, but not limiting to a cylindrical brake shoe.

In one embodiment, the base assembly 150 includes, a wheel assembly 158 configured at the distal ends of tripod base. In one embodiment, the tripod includes, at least three upper supporting bars/legs 154 and at least three lower supporting bars/legs 156. In one embodiment, the upper shaft 132 is configured to the support plate 112. In another embodiment, the lower shaft 134 is configured to the base assembly 150 via wearing sleeves 152.

Figure 3:
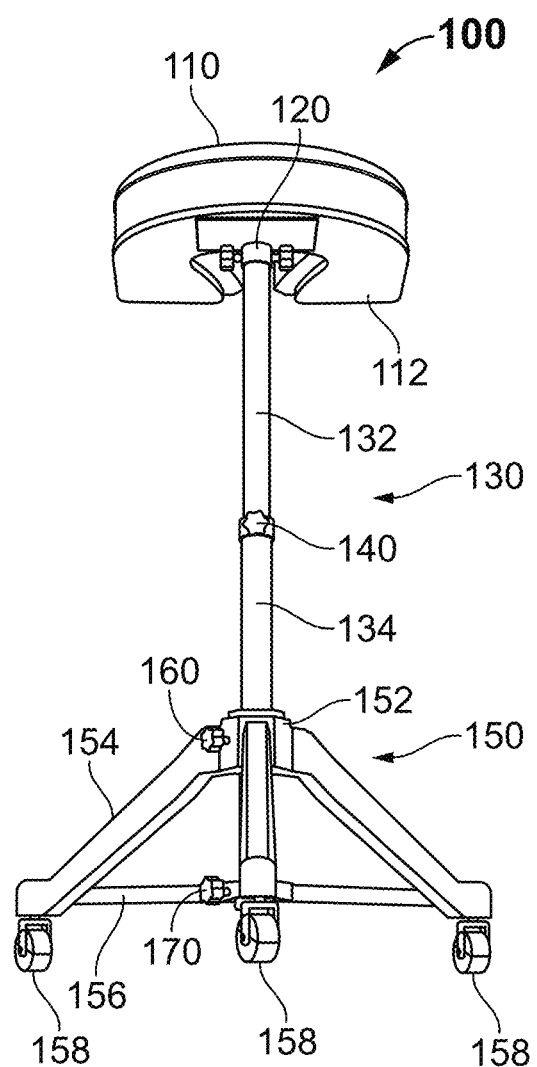
FIG. 3 shows a bottom perspective view of the apparatus in one embodiment of the present invention.

Referring to FIG. 3, a bottom perspective view of the apparatus 100 is illustrated. The pillow 110 is positioned over the support plate 112. In one embodiment, the support plate 112 is configured to the support pole 130 via one or more fasteners 120. In one embodiment, the bottom of the support plate 112 is connected to the top of the upper shaft 132 via one or more fasteners 120. In another embodiment, the bottom of the upper shaft 132 is configured to the top of the lower shaft 134 via the brake shoe 140. In one embodiment, the upper shaft 132 is slidably connected to the lower shaft 134 via the cylindrical brake shoe 140. In one embodiment, the locking means (120, 140, 160 and 170) are positioned in strategic positions along the apparatus 100 to allow maximum adjustability. In one embodiment, the base assembly 150 is provided with one or more upper supporting bars/legs 154 and one or more lower supporting bars/legs 156. In one embodiment, the upper supporting bar 154 is locked and released by activating the locking means 160. In another embodiment, the lower supporting bar 156 is locked and released by activating the locking means 170.

Figure 4:
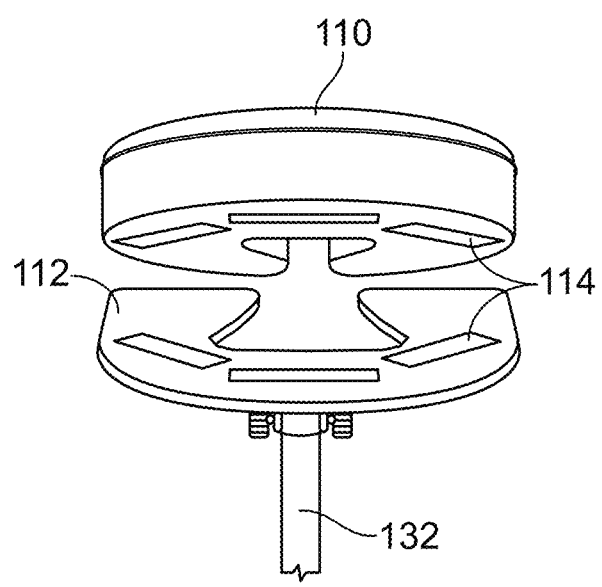
FIG. 4 shows an enlarged view of a pillow of the apparatus in one embodiment of the present invention.

Referring to FIG. 4, an enlarged view of the pillow 110 of the apparatus 100 is illustrated, according to an embodiment of the present invention. The pillow 110 is positioned over the top of the support plate 112. In one embodiment, the pillow 110 is mounted on the support plate 112 via one or more fasteners 114. In some embodiments, the fastener 114 includes, but not limited to a Velcro® type fastener or hook and loop fasteners. In another embodiment, the pillow 110 is detachable positioned over the support plate 112 as shown in FIG. 4.

Figure 5:
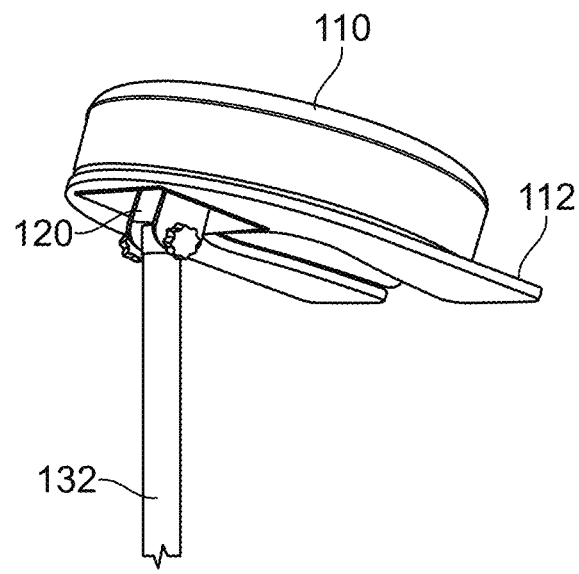
FIG. 5 shows a method of folding a support plate of the apparatus in one embodiment of the present invention.

Referring to FIG. 5, a method of folding a support plate 112 is illustrated. In one embodiment, the support plate 112 is designed in the shape of pillow 110 to provide more comfort to the user lying with face-down. In one embodiment, the distal ends of the support plate 112 is extended than the size of the pillow 110, thereby positioning the pillow 110 to the bed. In one embodiment, the support plate 112 is configured to the upper shaft 132 via one or more connectors/connecting means 120. In some embodiments, the connecting means 120 includes, but not limited to a pivot joint, folding hinge or rotating hinge.

Figure 6:
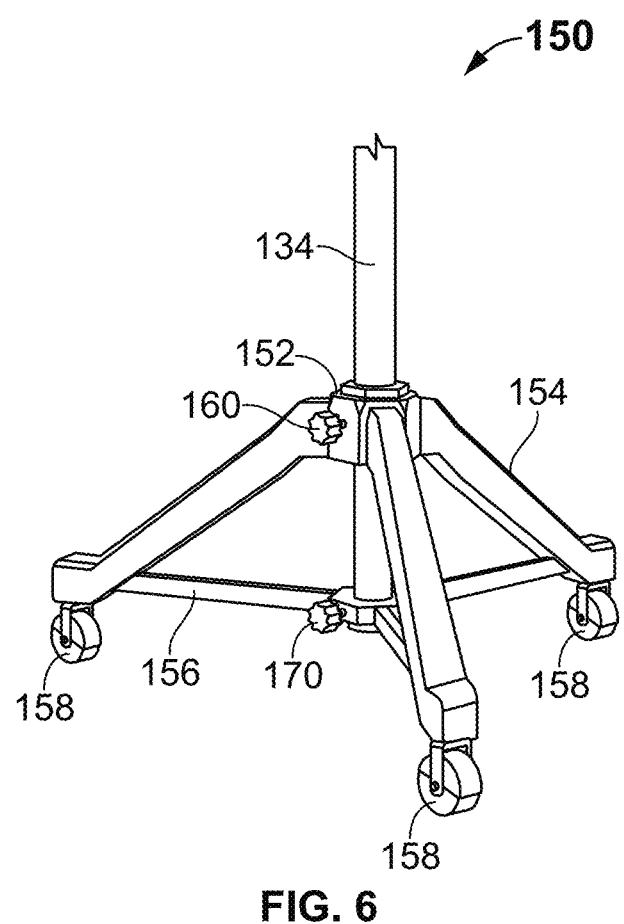
FIG. 6 shows a perspective view of a base assembly of the apparatus in one embodiment of the present invention.

Referring to FIG. 6, a perspective view of the base assembly 150 of the apparatus 100 is illustrated, according to an embodiment of the present invention. The base assembly 150 includes, a wheel assembly 158 configured at the distal ends of the legs of tripod base. In one embodiment, one end of the upper supporting bars 154 is configured to the long wearing sleeves 152 via a locking caster 160. In one embodiment, one end of the lower supporting bars 156 is configured to the distal end of the lower shaft 134 via a locking caster 170 In one embodiment, the distal end of the upper supporting bars 154 are connected to the distal end of the lower supporting bar 156. In one embodiment, the wheel 158 is configured at the connecting points of upper supporting bars 154 and lower supporting bars 156, thereby providing at least three legs in the base assembly 150. In another embodiment, the legs are collapsible legs. In one embodiment, the tripod base includes, at least three upper supporting bars 154 and at least three lower supporting bars 156. In one embodiment, the upper supporting bar 154 is locked and released by activating the locking means 160. In another embodiment, the lower supporting bar 156 is locked and released by activating the locking means 170. In one embodiment, the bottom of base assembly 150 is configured to the bottom of the lower shaft 134 via wearing sleeves 152. In one embodiment, the upper shaft 132, lower shaft 134 and upper supporting bars 154 are protected with plastic, long wearing sleeves to prevent surface wear and scratches.

Figure 7:
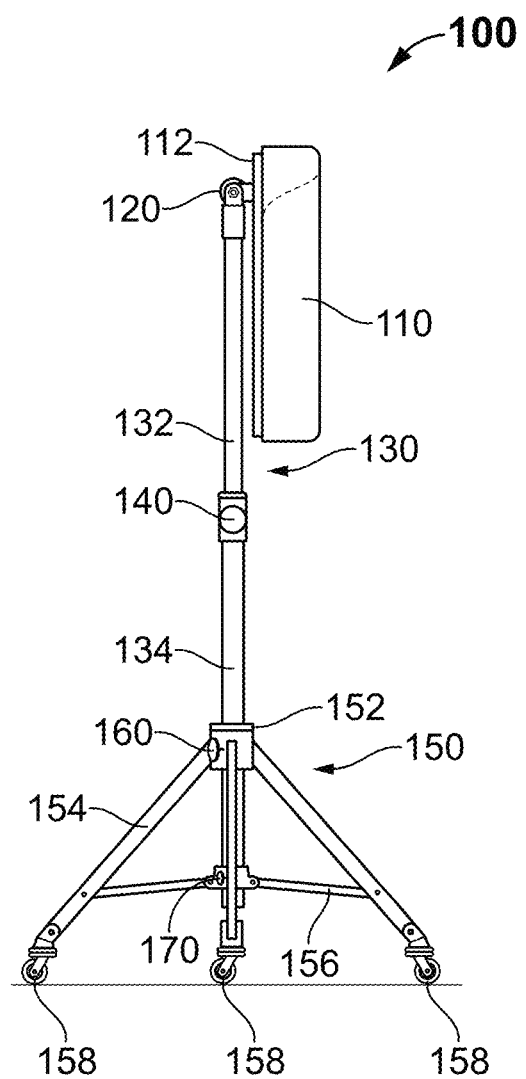
FIG. 7 shows a front view of the apparatus with folded pillow in one embodiment of the present invention.

Referring to FIG. 7, a front view of the apparatus 100 with folded pillow 110 is illustrated, in one embodiment of the present invention. The apparatus 100 is supported with the base assembly 150 with collapsible legs. In one embodiment, the pillow 110 is rotated and folded down against the upper shaft 132 for storage and transportation. The pillow 110 is mounted on the support plate 112 via fasteners 114 and is tapered to comfortably accept the face, with the client's nose at the floor, for the best positioning possible. In one embodiment, the support plate 112 is a metal support plate. In some embodiments, the support plate 112 is made from any of materials including, but not limited to iron, rubber or suitable durable materials. In one embodiment, the height adjustment of support pole 130 employs the cylindrical brake shoe to clamp down the upper shaft 132. In one embodiment, the upper shaft 132 is an inner shaft, which slides inside the lower shaft 134. In another embodiment, the lower shaft 134 is an outer shaft.

Figure 8A:
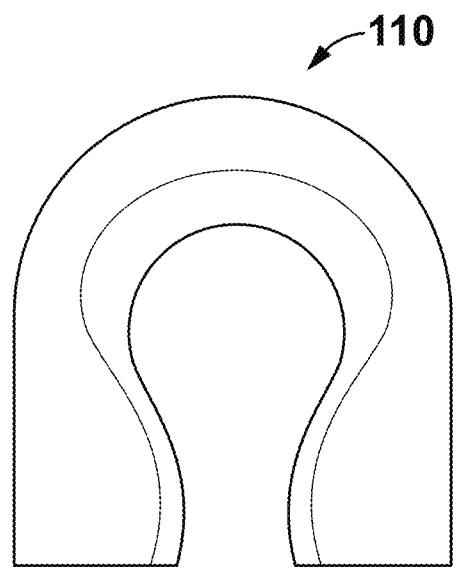
FIG. 8A shows a rear view of the pillow with support plate in one embodiment of the present invention.
Figure 8B:
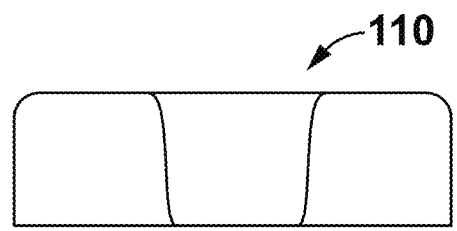
FIG. 8B shows a cross-sectional view of the pillow with support plate in one embodiment of the present invention.

Referring to FIG. 8A, a rear view of the pillow 110 with support plate 112 in one embodiment of the present invention. In one embodiment, a low density closed cell foam is covered with a cover. In one embodiment, the cover is a soft vinyl plastic cover. The cover is configured to provide a comfort to touch and easy to clean. In one embodiment, the pillow 110 is of C-shaped structure. The cross-sectional view of the pillow 110 with support plate 112 is illustrated, as shown in FIG. 8B.

Figure 9A:
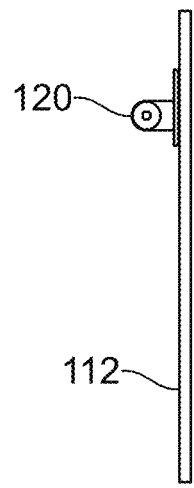
FIG. 9A shows a side view of a pivot joint connected to the support plate in one embodiment of the present invention.
Figure 9B:
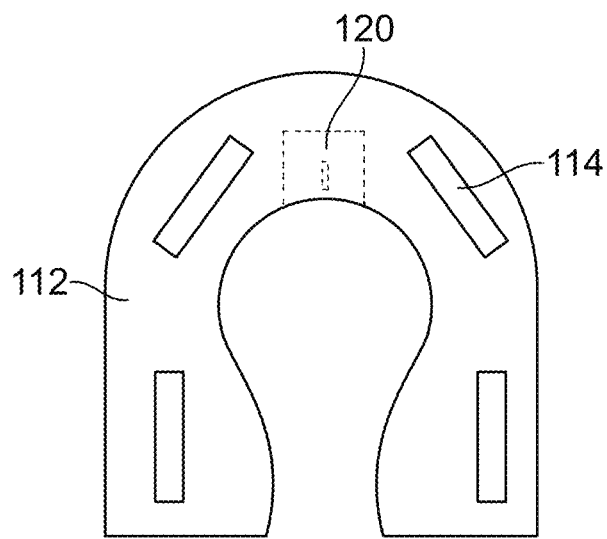
FIG. 9B shows a front view of the support plate with one or more fasteners in one embodiment of the present invention.

Referring to FIG. 9A, a side view of the pivot joint 120 connected to the support plate 112 is illustrated. In one embodiment, the steel support plate 112 is reinforced with the broader plate and is welded in place for the optimum strength. In another embodiment, the offset plate is welded to the steel support plate and employs a serrated washer combined with compression to hold the set angle. The front view of the support plate 112 configured with one or more fasteners 114, without pillow 110 is illustrated in FIG. 9B, according to an embodiment of the present invention. FIG. 9B depicts the rear position of pivot joint 120 to the support plate 112. In one embodiment, the foam pillow 110 is held onto the support plate 112 using mating H&L fasteners, allowing the pillow 110 to be removed for cleaning. In another embodiment, the support plate 112 is reinforced with gussets and the thickness is reduced to lower the weight of the facial interface.

Figure 10A:
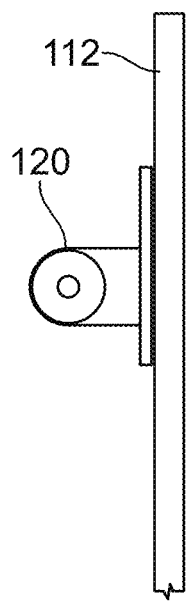
FIG. 10A shows the side view of a pivot joint connected to the support plate in one embodiment of the present invention.
Figure 10B:
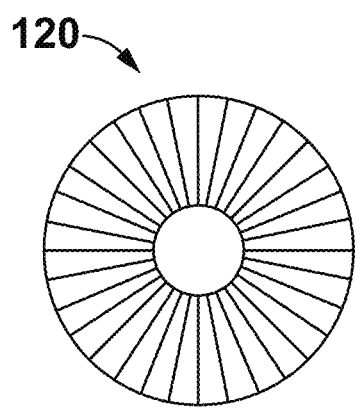
FIG. 10B shows an enlarged view of head of the pivot joint in one embodiment of the present invention.
Figure 10C:
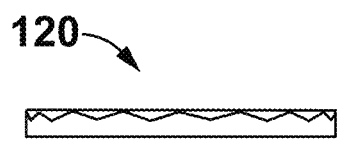
FIG. 10C shows a sectional view of the enlarged head of the pivot joint in one embodiment of the present invention.

Referring to FIG. 10A, a side view of the pivot joint connected to the support plate without pillow, is illustrated. FIGS. 10B and 10C exemplarily illustrates the enlarged view of the pivot joint head and sectional view of the enlarged pivot joint head, respectively. In one embodiment, the pivot joint 120 is a serrated angle lock. In one embodiment, the serrated washer is cast from steel and mates with the other washers welded to mating surfaces. This insures the face pillow 110 to be adjusted to the desired fine angular positions and retain those setting throughout the appointment. In another embodiment, the washers are welded to both sides of the support brace and the compression bolt slips through to the nut welded on the upper support shaft interface. The plastic knob then tightens down against the support brace and compress the washer surface together to set and retain the angle. In another embodiment, the steel components that make up the pivot assembly are, including the interface, powder painted and then thermally cured to provide a corrosion and scratch resistant surface.

Figure 11:
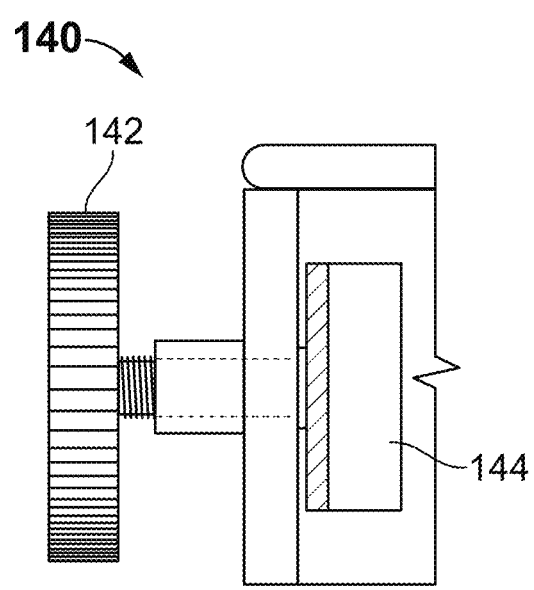
FIG. 11 shows an enlarged view of a cylindrical brake shoe in one embodiment of the present invention.

Referring to FIG. 11, an enlarged view of a cylindrical brake shoe 140 is illustrated in one embodiment of the present invention. By rotating the brake head 142 in alternate directions, the brake pad 144 penetrates into and leave the sliding path of the shafts (132 and 134). In one embodiment, the head 142 is rotated in one direction and the brake pad 144 protrude into the sliding path to fasten/tighten the shafts (132 and 134) and terminates the height adjustment process. In another embodiment, the head 142 rotated in another direction and the brake pad 144 leaves the sliding path to make required height adjustment. In another embodiment, the brake pad 144 is released to minimize or extend the height of the apparatus 100.

Figure 12:
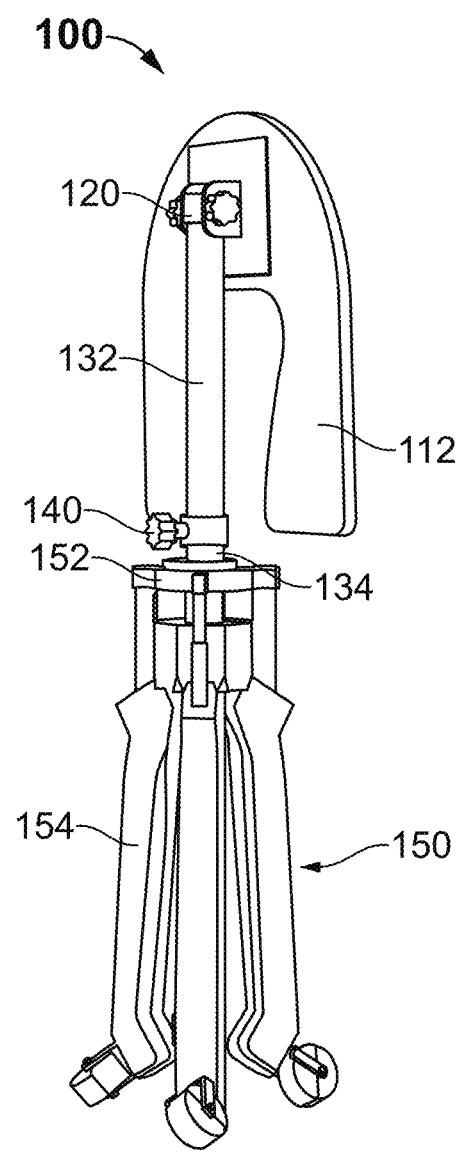
FIG. 12 shows the rear view of folded bedside face pillow apparatus in one embodiment of the present invention.

Referring to FIG. 12, the rear view of the folded bedside face pillow apparatus 100 is illustrated, in one embodiment of the present invention. In one embodiment, the locking means (120, 140, 160 and 170) are released to fold the apparatus 100. In one embodiment, the pivot joint 120 is released to fold down the support plate 112 parallel to the upper shaft 132. In another embodiment, the brake shoe 140 is released to slide the upper shaft 132 into the lower shaft 134 to minimize the height of the support pole 130. In one embodiment, the support pole 130 is a telescopic type adjustable support pole. In another embodiment, all the shaft connections are protected with plastic, long wearing sleeves 152 to prevent surface wear and scratches. These sleeves 152 with collar also contain the partial cylinder brake shoe 140 that is compressed against the internal tube to set the height. In some embodiments, the support pole 130 is constructed with any of materials including, but not limited to, strong metals, plastic, or suitable durable materials.

In one embodiment, the locking caster 170 is released to fold the lower supporting bars 156. In another embodiment, the locking caster 160 is released to fold the upper supporting bars 154. In some embodiment, the metal components are made from steel, which is chrome plated to provide a stylish surface that is highly corrosion and scratch resistant. In one embodiment, the collapsible legs slide up or down the lower shaft 134 to collapse or extend the legs, which in turn support the face pillow 110 at the optimum height.

The fabrication of the bedside face pillow includes, but not limited to the following materials and processes: The height adjustable shafts (132 and 134): These two shafts (132 and 134) are fabricated from drawn-over-mandrel (DOM) low carbon steel tubing. The lower shaft 134 is made from 1.00" tubing with 0.088" wall thickness and the upper shaft 132 will be made from 0.75" tubing with 0.088" wall thickness. The tubing will be cut to length using a CNC lathe, which also radiuses and deburrs the end surfaces. After cutting to length, the tubes will be cleaned and chrome plated to provide a polished surface that resists scratches, rust, and corrosion.

The legs (combination of upper supporting bars 154 and lower supporting bars 156): The legs are cut to length from cold rolled steel, 0.125" wall, U channel. The custom formed U channels are cut to length in a water jet machining center. All the required features are developed in the machining center. After fabrication, the U channel legs are cleaned and chrome plated before assembly. In final assembly, the legs are secured to the other components using stainless steel roll pins and rivets. The angle brackets: These angle rods and brackets are cut to shape using a CNC water jet machining center. The machining center develops all the features required for these rods and brackets from 0.125" thick cold rolled steel sheet. After fabrication, the angle brackets are cleaned and chrome plated before assembly. In assembly, they will be secured to the other components using stainless steel roll pins and rivets.

The support plate (pillow platform 112): This support, reinforcing, and connecting plates are cut to shape using a CNC water jet machining center. The machining center develops all the features required for these components from 0.125" thick cold rolled steel sheet. After cutting, the pieces are inserted in the welding jig and the robotic TIG welder welds on the serrated washers. After the washers are attached, the components to be welded are placed in the jig and the robotic TIG welder bonds them to the reinforcing and support plate. After fabrication, the part is cleaned, dried, powder coated, and thermally cured to provide a very durable surface for the support plate assembly. After painting, the 4 3.0" long strips of hook fasteners are glued to the upper surface.

The fittings: These fittings are cast using permanent molds using 360 alloy aluminum. The permanent molds produce precision fittings with very high strength and light weight. All the features are molded into the fitting, with only the hole needing to be tapped. This tapping operation to develop the ⅜-16 thread to mate with the knob is performed on a robotic tapping station. After the aluminum fittings are molded, tapped and deburred, they are cleaned and hard anodized to reduce wear. After fabrication, the plastic insert is slipped into the fitting and it ready to be installed in the product. The knob screws (a brake shoe 140): The knob screws are commercially available and have a 2.375" diameter knob that is molded around the ⅜-16 bolt. This stud is 0.75" long and feeds through the nut on the height adjustment slide and compresses the shoe against the shaft to retain the height. It also feed through the angle setting washers and into the nut welded on the side of the pivot fitting. Compression applied by the knob seats the angle washers and retains the set angle until the knob is turned to release the pressure.

The feet and casters (150, 160 and 170): The plastic feet and the locking casters are commercially available and snap together to create the ends for the legs of the tripod. The locking casters employ 2.125" diameter nylon plastic wheels that are non-marking. The 0.438" diameter stems have an interference fit to the holes in the feet and once installed, are very difficult to remove. The face piece (pillow 110): The face pillow section is fabricated from 0.25" thick marine plywood which has been cut to shape on a computer-controlled water jet machining center. The closed cell EVA foam can be selected in one of many different durometers to make the most comfortable and long wearing pillow. The EVA foam is shaped using reciprocating knives and machine sanding. After the foam is shaped, the vinyl cover is cut to shape, the foam and vinyl glued, and then pressed together. Then the assembly is stapled to the plywood backing. Then the decorative back cover is stitched, glued, and stapled into place. After final assembly, the mating loop fasteners are adhesively bonded and stapled to the back of the pillow.

The apparatus 100 according to the present invention, could be used by professionals in clinic, spa, doctor's office or use at home. The apparatus 100 is collapsible and easily transported or stored and can be set up or folded down in seconds. The apparatus 100 is ready to make any massage or physical exam the maximum in comfort and portability for the user. Thus, makes the apparatus 100 more user-friendly. The apparatus 100 is fold up into a compact size when not in use and can be conveniently transported or stored in this configuration. The apparatus 100 provides the user with ultimate comfort for any application of therapy or treatment when in a face-down position. Further, the apparatus 100 could be used in doctor's offices, clinics, spas, or home.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An adjustable face pillow apparatus comprising:
   a C-shaped support plate having a bottom surface and a top surface, wherein the top surface includes at least one fastening mechanism to enable a C-shaped pillow to be removably fastened to the top surface, and wherein distal ends of the support plate are flat and extend past the pillow to directly contact an external vertical surface that is lower than and directly connected to an external horizontal surface in order to aid in positioning the pillow relative to the external horizontal surface;
   a support plate pivot having:
      a support brace formed by two bracket arms coupled to the support plate, wherein at least one of the bracket arms has a hole extending therethrough; and
      a bolt sized to pass through the hole in the bracket arm to secure the support brace to an upper shaft section when the bolt is tightened;
   a cylindrical adjustable shaft having:
      the upper shaft section rotatably coupled to the bottom surface of the support plate via the support plate pivot, wherein the support plate pivot enables rotation of the support plate relative to the upper shaft section;
      a lower shaft section configured to slidably engage the upper shaft section, wherein the lower shaft section is slidable relative to the upper shaft section to alter a vertical position of the support plate relative to a base assembly; and
      a shaft locking mechanism configured to lock a position of the upper shaft section relative to the lower shaft section;
   upper and lower wearing sleeves configured to slidably receive the lower shaft section, wherein the lower shaft section is able to slide within the upper and lower wearing sleeves; and
   the base assembly having:
      a plurality of upper supporting bars coupled to the lower shaft section via the upper wearing sleeve;
      a plurality of lower supporting bars coupled to the lower shaft section via the lower wearing sleeve; and
      a base assembly locking mechanism configured to lock a position of at least one of the upper and lower wearing sleeves relative to the lower shaft portion,
   wherein the support plate can be rotated around a longitudinal axis of the shaft without moving the base assembly, and wherein an angle of the support plate relative to the longitudinal axis of the shaft can be selected and locked into place with the support plate pivot.

2. The adjustable face pillow apparatus of claim 1 wherein the external horizontal surface is a surface of at least one of a bed, an examination table, and a massage table.

3. The adjustable face pillow apparatus of claim 1 wherein the pillow is tapered to accept a person's face.

4. The adjustable face pillow apparatus of claim 1 wherein the support plate is made of rubber.

5. The adjustable face pillow apparatus of claim 4 wherein the support plate pivot further includes an offset plate coupled to the support plate, wherein the support brace is coupled to the offset plate.

6. The adjustable face pillow apparatus of claim 1 wherein the base assembly further includes a plurality of wheels, wherein each of the wheels is coupled to a distal end of one of the upper supporting bars.

7. An adjustable face pillow apparatus comprising:
   a support plate having a bottom surface and a top surface, wherein the top surface includes at least one fastening mechanism to enable a pillow to be removably fastened to the top surface, and wherein a distal end of the support plate is flat and extends past the pillow to directly contact an external vertical surface that is lower than and directly connected to an external horizontal surface in order to aid in positioning the pillow relative to the external horizontal surface;
   a support plate pivot coupled to the bottom surface of the support plate;
   a cylindrical adjustable shaft having:
      an upper shaft section rotatably coupled to the support plate pivot, wherein the support plate pivot enables rotation of the support plate relative to the upper shaft section;
      a lower shaft section configured to slidably engage the upper shaft section, wherein the lower shaft section is slidable relative to the upper shaft section to alter a vertical position of the support plate relative to a base assembly; and
      a shaft locking mechanism configured to lock a position of the upper shaft section relative to the lower shaft section;
   upper and lower wearing sleeves configured to slidably receive the lower shaft section, wherein the lower shaft section is able to slide within the upper and lower wearing sleeves; and
   the base assembly having:
      a plurality of upper supporting bars coupled to the lower shaft section via the upper wearing sleeve;
      a plurality of lower supporting bars coupled to the lower shaft section via the lower wearing sleeve; and
      a base assembly locking mechanism configured to lock a position of at least one of the upper and lower wearing sleeves relative to the lower shaft portion,
   wherein the support plate can be rotated around a longitudinal axis of the shaft without moving the base assembly, and wherein an angle of the support plate relative to the longitudinal axis of the shaft can be selected and locked into place with the support plate pivot.

8. The adjustable face pillow apparatus of claim 7 wherein the external horizontal surface is a surface of at least one of a bed, an examination table, and a massage table.

9. The adjustable face pillow apparatus of claim 7 wherein the pillow is tapered to accept a person's face.

10. The adjustable face pillow apparatus of claim 7 wherein the support plate is made of rubber.

11. The adjustable face pillow apparatus of claim 10 wherein the support plate pivot includes an offset plate coupled to the support plate.

12. The adjustable face pillow apparatus of claim 7 wherein the base assembly further includes a plurality of wheels, wherein each of the wheels is coupled to a distal end of one of the upper supporting bars.

13. The adjustable face pillow apparatus of claim 7 wherein the support plate pivot is one of a pivot joint, a folding hinge, a rotating hinge, and a serrated angle lock.

* * * * *